D. C. MUNGER.
CUSHION TIRE FOR VEHICLE WHEELS.
APPLICATION FILED DEC. 16, 1911.

1,070,715.

Patented Aug. 19, 1913.

Witnesses

Inventor

By

Attorney

UNITED STATES PATENT OFFICE.

DEO CLIFTON MUNGER, OF ELLSWORTH, WISCONSIN.

CUSHION-TIRE FOR VEHICLE-WHEELS.

1,070,715.   Specification of Letters Patent.   Patented Aug. 19, 1913.

Application filed December 16, 1911. Serial No. 666,164.

*To all whom it may concern:*

Be it known that I, DEO CLIFTON MUNGER, a citizen of the United States, residing at Ellsworth, in the county of Pierce and State of Wisconsin, have invented certain new and useful Improvements in Cushion-Tires for Vehicle-Wheels, of which the following is a specification.

My invention relates to substitutes for pneumatic and other cushion tires used on vehicle wheels and has for its object the provision of a device consisting of two bands concentrically arranged and spaced apart by substantially V shaped springs, said device being adapted to be removably secured to a vehicle wheel as ordinarily constructed for pneumatic and similar cushion tires, said tire being very efficient in operation and self cleaning.

Figure 1:
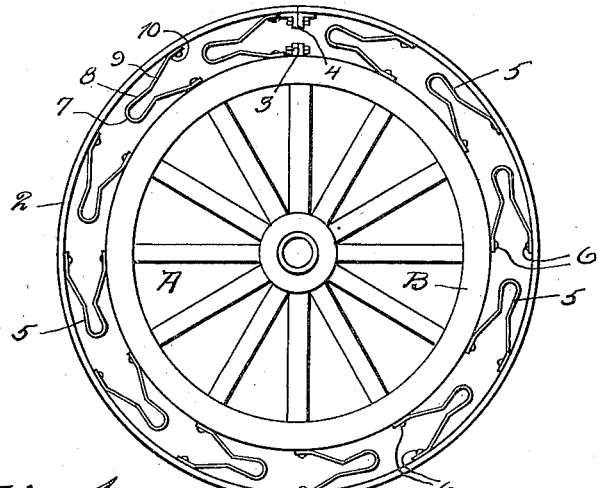
Figure 2:
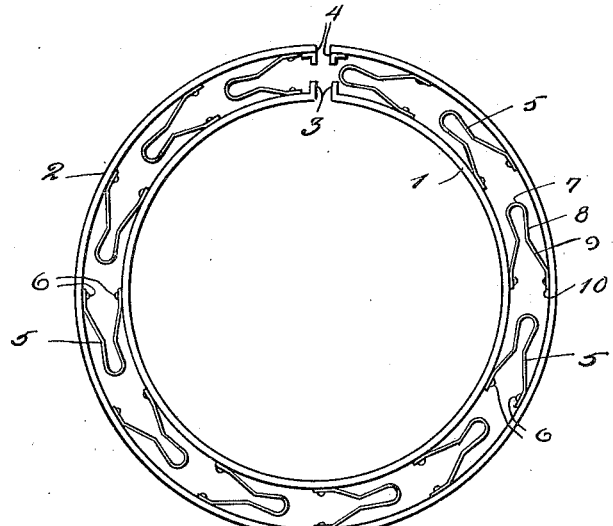
Figure 3:
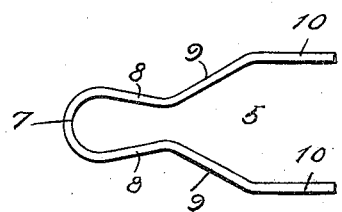

My invention will be described in detail hereinafter and illustrated in the accompanying drawings in which, Figure 1 is a side view of a wheel, showing my improved tire in position. Fig. 2, a similar view of the tire removed from the wheels, Fig. 3, a detail view of one of the springs.

In the drawings similar reference characters will be used to designate corresponding parts in all of the views.

A indicates a wheel of the ordinary construction as used on motor propelled vehicles and the like and provided with the recessed or grooved rim B in which is ordinarily secured a pneumatic or the like tire (not shown).

As stated above my invention consists in providing substitutes for the pneumatic tire usually employed, which substitutes I will now proceed to describe.

1 and 2 indicate two bands of steel or other suitable material, said bands being bent into the form of rings, the inner band, having its ends bent outwardly to form ears 3 through which a bolt or other securing means is adapted to be secured to hold the band in position in the recessed or grooved rim B. The outer band 2 has angular pieces 4 secured to the inner sides of its ends and adapted to receive bolts or other fastening means (not shown) to hold the ends of the band together.

5 indicates springs that are, as shown, substantially V-shaped in form and secured to bands 1 and 2 by means of rivets 6 or other suitable fastening means, said springs being constructed of bars of steel or other similar material, either flat or round, half round or any other form desired. In forming the springs 5 each bar is bent in its middle as shown at 7, said bent portion being round as shown to prevent the weakening the spring where bent. The two ends of the bar are then extended on planes substantially parallel with one another and then given undulations toward each other, as shown at 8, and then curved outwardly, away from one another as shown at 9, and finally extended on planes substantially parallel with one another, as shown at 10, the portions 10 being designed to be secured to bands 1 and 2, as heretofore stated.

In use it will be apparent that my improved tire is capable of being applied to wheels ordinarily used with pneumatic tires, in that the band 1 fits in the peripheral groove in the rim as stated above and may be removed and replaced as desired for repair. In practice the springs 5 are made of material sufficiently heavy to prevent breaking by sidewise movement of the outer band or tread 2 in rounding curves, traveling over uneven roads, and when subjected to shock by striking stones, holes in the road and other obstructions. Furthermore the rounded angles 7 and undulations 8 prevent the springs from breaking under unusual strains.

Having thus described my invention what I claim is—

A cushion tire for vehicle wheels comprising bands spaced apart, the ends of the inner band having outwardly bent ears, securing means connecting said ears, angular pieces secured to the inner sides of the ends of the outer band, securing means connecting said angular pieces, V-shaped springs having rounded angles, undulations in the arms of said springs, and the ends of the arms curved outwardly and extended in substantially parallel planes away from the arms of the springs, said substantially parallel portions being secured to the bands aforesaid.

In testimony whereof I hereto affix my signature in the presence of two witnesses.

DEO CLIFTON MUNGER.

Witnesses:
GEORGE THOMPSON,
C. E. HOFFMAN.

Copies of this patent may be obtained for five cents each, by addressing the "Commissioner of Patents, Washington, D. C."